United States Patent [19]

Ando et al.

[11] Patent Number: 4,642,127
[45] Date of Patent: Feb. 10, 1987

[54] METHOD FOR COOLING BLAST FURNACE GAS IN AN HEAT RECOVERY SYSTEM

[75] Inventors: Takehiro Ando, Ibaraki; Hideo Kimura, Nara; Noriyuki Oda, Sennan; Takeji Asai, Hyogo; Ken Mochizuki, Kita-kyushu; Toshihisa Fujihara, Kita-kyushu; Katsuji Maeda, Kita-kyushu, all of Japan

[73] Assignees: Sumitomo Metal Industries, Ltd.; Hitachi Shipbuilding & Engineering Company Limited, both of Osaka, Japan

[21] Appl. No.: 736,402

[22] Filed: May 20, 1985

Related U.S. Application Data

[63] Continuation of Ser. No. 488,161, Apr. 25, 1983, which is a continuation-in-part of Ser. No. 288,308, Jul. 30, 1981, abandoned.

[30] Foreign Application Priority Data

Aug. 28, 1980 [JP] Japan ................................. 55-119131

[51] Int. Cl.$^4$ ...................... B01D 50/00; B01D 51/00
[52] U.S. Cl. .......................................... 55/20; 55/90; 55/267
[58] Field of Search ................... 55/20, 23, 83, 90, 92, 55/227, 260, 267; 261/116, 118, DIG. 9; 60/39.02, 39.58

[56] References Cited

U.S. PATENT DOCUMENTS

| | | | |
|---|---|---|---|
| 3,282,514 | 11/1966 | Putz | 55/20 X |
| 3,388,897 | 6/1968 | Calaceto | 261/118 X |
| 3,431,707 | 3/1969 | Berg | 55/20 |
| 3,456,928 | 7/1969 | Selway | 261/DIG. 9 X |
| 3,483,674 | 12/1969 | Wendel et al. | 55/135 X |
| 3,485,012 | 12/1969 | Deussner | 55/227 X |
| 3,495,384 | 2/1970 | Alliger | 261/DIG. 9 X |
| 3,626,672 | 12/1971 | Burbidge | 55/267 X |
| 3,713,277 | 1/1973 | Sackett, Sr. | 261/116 X |
| 4,067,557 | 1/1978 | Inubushi et al. | 60/39.02 X |
| 4,072,006 | 2/1978 | Inubushi et al. | 60/39.02 X |
| 4,270,343 | 6/1981 | Shirato | 60/39.58 X |

Primary Examiner—Kathleen J. Prunner
Attorney, Agent, or Firm—Joseph W. Farley

[57] ABSTRACT

A method and an apparatus for cooling blast furnace gas for use in a blast furnace gas treating system having incorporated therein a coarse particle removing unit having a dust collecting box. Nozzles extend through the box as arranged circumferentially thereof at a plurality of locations for injecting a cooling fluid into the unit without wetting the inner wall thereof. Since the unit which has a large capacity is used also as a cooling container, a large quantity of cooling fluid can be injected to effectively cool the blast furnace gas even when the gas has a considerably high temperature. The system can be constructed at a low cost without necessitating any additional cooling container.

2 Claims, 10 Drawing Figures

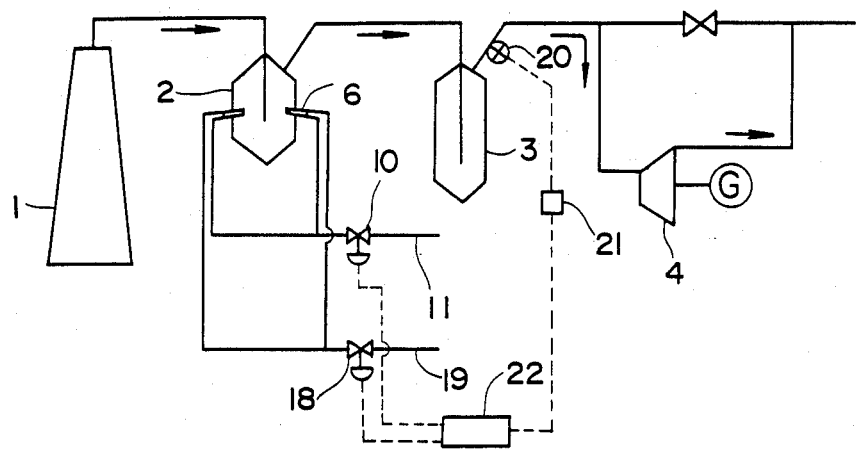
FIG. 1
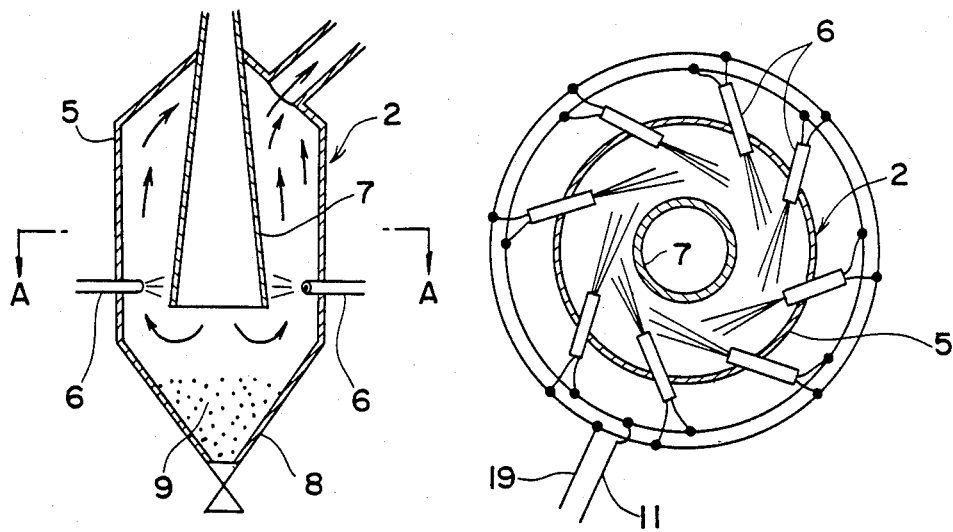
FIG. 2
FIG. 3

FIG. 7a
FIG. 7b
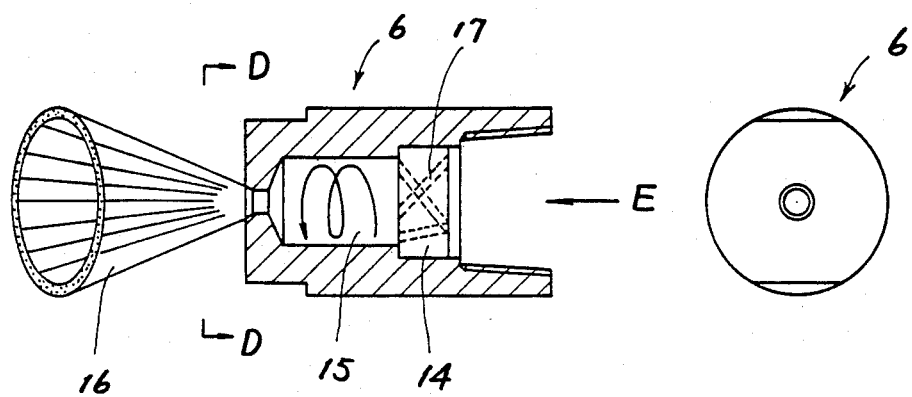
FIG. 7c
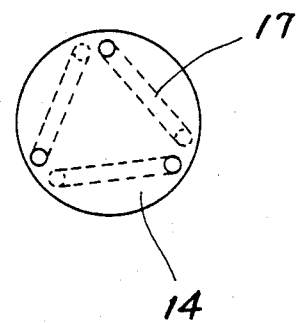

METHOD FOR COOLING BLAST FURNACE GAS IN AN HEAT RECOVERY SYSTEM

This is a continuation of application Ser. No. 06/488,161, filed Apr. 25, 1983, now abandoned, which is a continuation-in-part of application Ser. No. 06/288,308, filed July 30, 1981, now abandoned.

The present invention relates to a method and an apparatus for use in a blast furnace gas treating system for cooling the blast furnace gas when the temperature of the gas has risen to an abnormal high level due to a trouble occurring in the interior of the blast furnace.

With a blast furnace gas treating system, such as the energy recovering system disclosed in U.S. Pat. No. 4,400,184, which comprises the arrangement of blast furnace; dust catcher, cyclone or like coarse particle removing unit; bag filter, electric precipitator or like dry-type fine particle removing unit, there is the need to rapidly cool the blast furnace gas when the temperature of the gas has risen to an abnormal high level due to a trouble occurring in the furnace, such as a blow of gas through the furnace, since the dry-type dust collector is generally unsuited to high temperatures. While the gas is cooled by injecting water or like cooling fluid into the blast furnace gas piping system, the gas, when having a high temperature, requires a large quantity of cooling fluid. For example, when the temperature of a blast furnace gas, normally flowing at a temperature of 140° C., pressure of 1.5 atg and rate of 400,000 Nm$^3$/h, rises to 700° C. at the same flow rate in the event of the furnace malfunctioning, the gas requires injection of 143 m$^3$/h of water for cooling to 140° C. If nozzles each having a capacity of 2.44 m$^3$/h are used for injecting the cooling fluid, as many as 59 nozzles are needed.

Further since the dust in the blast furnace gas is very liable to deposition, the wall of the gas channel, if wetted with drops of the water injected, will permit accumulation of the dust on the wall to narrow the channel, possibly giving rise to a serious problem to the operation of the blast furnace. Moreover, if drops of the water injected remain unevaporated and enter the bag filter to wet the bag, an increased pressure loss and deterioration of the material of the bag will result.

Accordingly it is desired to inject water into a sufficiently large container to prevent the drops of injected water from wetting the wall of the container and to permit the gas to enter the bag filter after staying in the container for a period of time sufficient for the evaporation of the water. Whereas it is technically easy to provide a cooling container of large capacity between the dust catcher and the bag filter, this entails the problem of necessitating an increased equipment cost.

We have accomplished the present invention, directing attention to the fact that a dust catcher, cyclone or like coarse particle removing unit inherently has a large capacity. An object of the invention is to provide a method of cooling blast furnace gas which can be practiced inexpensively and reliably without using any cooling container.

To fulfill this object, the present invention provides a method of cooling blast furnace gas for use in a blast furnace gas treating system having incorporated therein a coarse particle removing unit comprising an inlet tube for introducing the blast furnace gas into the unit and a dust collecting box surrounding the inlet tube. The method is characterized in that a cooling liquid is injected into the dust collecting box from a plurality of locations spaced apart circumferentially thereof between the dust collecting box and the inlet tube in corresponding horizontal or obliquely upward directions substantially tangentially of the outer periphery of the inlet tube.

Since the coarse particle removing unit is used also as a cooling container, the method of the invention does not require any additional cooling container and can therefore be practiced at a low cost. Furthermore, the coarse particle removing unit, which has a very large capacity, permits injection of a large amount of the cooling liquid thereinto. Because the liquid in injected in the directions specified as above, the inner wall of the coarse particle removing unit is prevented from the deposition of liquid drops and therefore from the accumulation of dust. Consequently the blast furnace gas can be cooled with high reliability even when having a considerably high temperature.

Another object of the invention is to provide a blast furnace cooling apparatus in addition to the cooling method described above.

The above and various other features and advantages of the invention will become apparent from the following embodiment described with reference to the accompanying drawings.

DESCRIPTION OF THE DRAWINGS

FIG. 1 is a diagram showing a blast furnace gas treating system in its entirety;

FIG. 2 is a view in vertical section showing a coarse particle removing unit equipped with horizontal cooling liquid nozzles;

FIG. 3 is a view in section taken along the line A—A of FIG. 2;

FIG. 6b is a view taken in the direction of the arrow C of FIG. 6a;

FIG. 7a is a view partly in longitudinal section showing an example of a hollow cone nozzle;

FIG. 7b is a view taken in the direction of the arrows D—D of FIG. 7a; and

FIG. 7c is a slightly enlarged view taken in the direction of the arrow E of FIG. 7a showing a whirler.

With reference to FIG. 1 schematically showing a system for recovering energy from blast furnace gas, the blast furnace gas discharged from a blast furnace 1 is introduced into a dust catcher 2, an example of a coarse particle removing unit, in which coarse particles are removed from the gas. The gas is then led into a bag filter 3, an example of a dry-type dust collector, in which fine particles are removed. The gas is then fed to a power recovering turbine 4 connected to a generator G.

The dust catcher 2 comprises a dust collecting box 5 an inlet tube 7 extending into the box 5 for introducing the gas into the box and an outlet located above the lower end of the inlet tube. A plurality of nozzles 6 mounted on the box 5 are arranged circumferentially thereof at a plurality of locations for injecting a cooling liquid, such as water, into the box 5 as seen in FIGS. 2 and 3. The nozzles 6 have outlets which are positioned in the same horizontal plane. The nozzle outlets need not always be positioned in the same horizontal plane but can be at slightly different levels. The nozzles 6 are located at substantially the same level as the lower end of the inlet tube 7 so that the cooling liquid will be properly entrained in the flow of blast furnace gas and stay in the box 5 for the longest possible period of time for complete evaporation. The cooling liquid is injected from the nozzles 6 in corresponding directions approximately tangentially of the outer periphery of the inlet tube 7 so that the main streams of injected liquid will not strike and wet the outer periphery.

Figure 4:
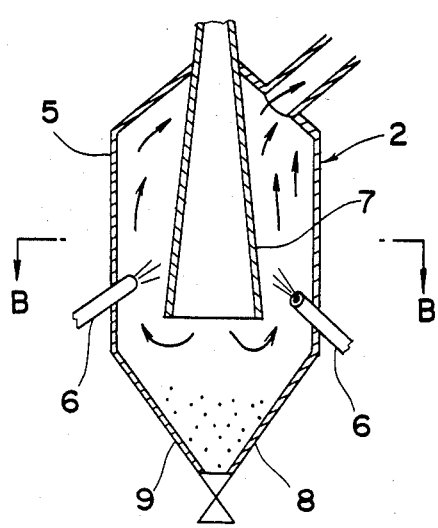
FIG. 4 is a view in vertical section showing a coarse particle removing unit equipped with obliquely upward cooling liquid nozzles.
Figure 5:
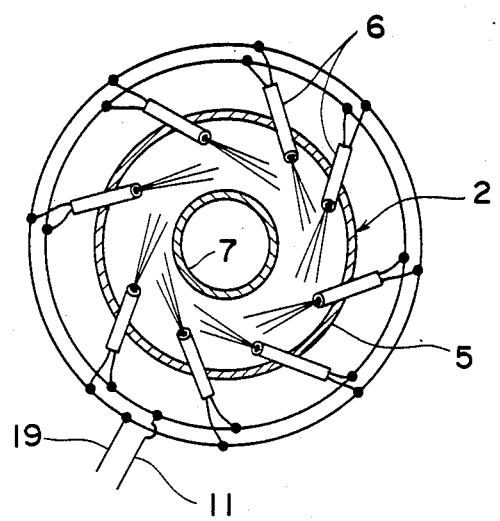
FIG. 5 is a view in section taken along the line B—B of FIG. 4.

Furthermore, the liquid is injected in horizontal (FIGS. 2 and 3) or obliquely upwardly (FIGS. 4 and 5) directions so as not to wet and solidify the dust 9 accumulating in a hopper portion 8 of the box 5.

Figure 6A:
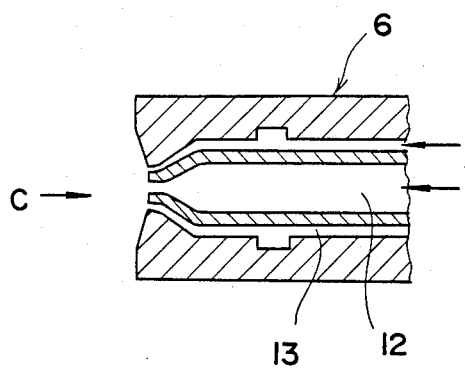
FIG. 6a is a view in longitudinal section showing an example of a two-fluid nozzle.
Figure 6B:
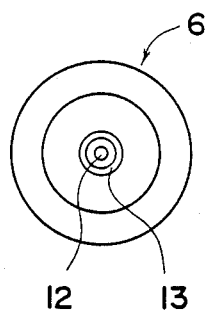

The nozzles 6 are preferably the two-fluid type of FIGS. 6a and 6b having a cooling liquid passage 12 connectable to a cooling fluid supply line 11 (FIGS. 1, 3 and 5) and a compressed gas passage 13 connectable to a compressed gas supply line 19 (FIGS. 1, 3 and 5); or, the hollow cone type of FIGS. 7a–7c in which cooling liquid passes through a whirler 14, communicating with a cooling liquid supply line corresponding to the one indicated at 11 in FIG. 1 and having slanting passages 17, into a swirling chamber 15 and is dischanged as a hollow cone 16 consisting of fine droplets of cooling fluid.

When the nozzles 6 used are of the two-fluid type or of the hollow cone type as described above, the distance the injected cooling liquid (e.g. water) reaches is up to 6 to 8 m at the most. If the blast furnace gas is then supplied to the dust catcher 2 at a rate of 40,000 Nm$^3$/h and pressure of 1.5 atg as already mentioned, the injected water will not wet the inner periphery of the dust collecting box 5 since the box 5 is about 17 m in inside diameter and the inlet tube about 4.5 m in outside diameter.

As shown in FIG. 1, a temperature sensor 20 detects the temperature of the blast furnace gas at the outlet of the bag filter 3 and feeds a detected temperature to a control device 22 through an amplifier 21. The control device 22 controls a valve 10 arranged in the cooling liquid supply line 11 and, in the case of the nozzles 6 of the two-fluid type, further controls a valve 18 disposed in the compressed gas supply line 19.

The present invention described above has the following advantages.

(a) Since water is injected into a coarse particle removing unit having a flow channel of large cross sectional area and permitting the gas to flow therethrough at a low rate, the drops of water stay in the unit for a prolonged period of time.

(b) Since water is injected into the coarse particle removing unit in horizontal or obliquely upward directions substantially tangential to the outer periphery of the inlet tube of the unit and in corresponding directions, the injected water produces a spiral flow of blast furnace gas which ascends in the space between the dust collecting box of the unit and the inlet tube. Consequently the drops of water mix with the gas effectively while staying in the unit for an increased period of time.

(c) The water, which is injected in the directions specified as above, does not wet the wall of the flow channel or the dust accumulated in the hopper.

What is claimed is:

1. A method of cooling blast furnace gas in a blast furnace gas treating system in which gas discharged from a blast furnace is conducted to a dry-type coarse particle removing unit arranged downstream from the furnace and comprising an inlet tube having a downwardly directed lower end, a dust collecting box surrounding the inlet tube and having an outlet above the lower end of the inlet tube, said removing unit being adapted to normally remove in a dry manner coarse particles from the gas discharged from the furnace by introducing the gas downwardly through the inlet tube and causing the gas to flow upward in the dust collecting box to be discharged through the outlet;

a dry-type particle removing unit is connected to and arranged downstream from the coarse particle removing unit for removing the remaining particles from the gas discharged by the coarse particle removing unit; and a turbine is connected to and disposed downstream from the fine particle removing unit for recovering energy from the gas discharged by the fine particle removing unit;

said method comprising detecting the temperature of the blast furnace gas at the outlet of the fine particle removing unit, and when the detected temperature exceeds a specified value indicating that the blast furnace gas is approaching a high temperature unsuitable for the fine particle removing unit, rapidly cooling the blast furnace gas utilizing the dry-type coarse particle removing unit to perform the additional function of cooling the blast furnace gas to a temperature at least as low as said specified value by supplying a cooling liquid into the dust collecting box in a manner such as to avoid wetting by the cooling liquid of the interior of the dust collecting box and the outer periphery of the inlet tube, said supplying step being carried out by positioning a plurality of two-fluid or hollow cone nozzles with their outlets arranged in circumferentially spaced relation with the periphery of the inlet tube and at substantially the same level as the lower end of the inlet tube and, directing the nozzle outlets in corresponding horizontal or obliquely upward directions substantially tangentially of the outer periphery of the inlet tube, thereby completely entraining the cooling liquid in the blast furnace gas flowing upwardly in the dust collecting box from the inlet tube and completely evaporating the cooling liquid prior to the discharge of the blast furnace gas through the outlet of the dust collecting box.

2. A method as defined in claim 1 further comprising positioning the outlets of the nozzles in the same horizontal plane.

* * * * *